US005803655A

United States Patent [19]

Furuya

[11] Patent Number: 5,803,655

[45] Date of Patent: Sep. 8, 1998

[54] LOCK MECHANISM

[75] Inventor: Yoshinobu Furuya, Shizuoka, Japan

[73] Assignee: Yazaki Corporation, Tokyo, Japan

[21] Appl. No.: 792,837

[22] Filed: Jan. 30, 1997

[30] Foreign Application Priority Data

Feb. 2, 1996 [JP] Japan .................................... 8-017792

[51] Int. Cl.[6] ........................................................ F16B 2/20

[52] U.S. Cl. .......................... 403/398; 403/321; 403/168; 24/616

[58] Field of Search ..................................... 403/398, 399, 403/396, 384, 353, 321, 315, 397, 186, 167, 168; 24/616; 439/372

[56] References Cited

U.S. PATENT DOCUMENTS

| | | | |
|---|---|---|---|
| 1,484,999 | 2/1924 | Steiner | 403/353 |
| 4,128,354 | 12/1978 | Amrogowicz | 403/353 X |
| 4,136,983 | 1/1979 | Dobberpuhl | 403/396 X |
| 4,225,265 | 9/1980 | Hooker et al. | 403/353 |
| 5,174,781 | 12/1992 | Muzslay | 439/372 |
| 5,564,935 | 10/1996 | Yagi et al. | 439/372 X |

FOREIGN PATENT DOCUMENTS

| | | | |
|---|---|---|---|
| 2302434 | 9/1976 | France | 403/353 |
| 55-153744 | 11/1980 | Japan . | |
| 5-205714 | 8/1993 | Japan . | |
| 554421 | 4/1977 | U.S.S.R. | 403/321 |
| 748047 | 7/1980 | U.S.S.R. | 403/353 |

*Primary Examiner*—Harry C. Kim
*Attorney, Agent, or Firm*—Finnegan, Henderson, Farabow, Garrett & Dunner, L.L.P.

[57] ABSTRACT

A lock mechanism effectively used for locking, for example, an interrupting handle of an electric interrupter in an OFF position. The lock mechanism includes two plate-like lock piece portions which are juxtaposed to each other substantially in a common plane when effecting the locking, engagement grooves which are formed respectively through the lock piece portions in a direction of a thickness of the lock piece portions, and have respective openings formed respectively in their respective end surfaces which are juxtaposed to each other, and face in the same direction, and a lock ring of a square-loop shape having opposed straight portions to be fitted respectively in the engagement grooves to interconnect the two lock piece portions. When viewed in the direction of the thickness of the lock piece portions, each of the engagement grooves has an L-shape defined by an introduction groove portion and a slide groove portion. A first holding portion and a second holding portion each for holding the straight portion of the lock ring are formed respectively at the introduction groove portion and the slide groove portion of one of the two lock piece portions.

5 Claims, 5 Drawing Sheets

LOCK MECHANISM

BACKGROUND OF THE INVENTION

1. Field of the Invention

This invention relates to a lock mechanism effectively used for locking, for example, an interrupting handle of an electric interrupter in an OFF position.

2. Description of the Related Art

FIG. 5 shows the appearance of an electric interrupter (safety plug) 1 of an electric car. As shown in FIG. 7, this electric interrupter 1 is interposed between a battery 10 and an electric junction box 12 for distributing electric power to each load 11, and selectively interrupts a circuit. As shown in FIG. 5, an interrupting handle 3 for turning on and off the circuit is pivotally mounted on a side surface 2*a* of a casing 2. When the handle 3 is pivotally moved outwardly into a horizontal position as shown in FIG. 5, the circuit is turned on, and when the handle 3 is pivotally moved inwardly through an angle of 180 degrees into a horizontal position, the circuit is turned off.

The interrupter 1 of this kind is provided with a lock mechanism 4 for locking the handle 3 in the OFF position during maintenance and the like for safety purposes. In the conventional lock mechanism 4, as shown in FIG. 6, a lock cover 8 of U-shaped cross-section is pivotally connected by a pin 7*a* to a boss 7 formed on the side surface 2*a* of the casing 2, and when the handle 3 is manipulated into the OFF position (shown in FIG. 6), the lock cover 8 is turned through 90 degrees to be fitted on a rib 5 of the handle 3, thereby holding the handle 3 against pivotal movement. In this case, if the lock cover 8 is merely fitted on the rib 5 of the handle 3, there is a possibility that the lock cover 8 is turned, so that the locking of the handle 3 is released. Therefore, a hole 8*a* in the lock cover 8 is aligned with a hole 6 in the rib 5 of the handle 3, and a lock pin 9 is inserted into the aligned holes 6 and 8*a* to prevent the pivotal movement of the lock cover 8, thus locking the handle 3 substantially in a double manner.

FIGS. 8 and 9 show other known lock mechanisms, respectively.

The construction shown in FIG. 8 is disclosed in Japanese Utility Model Unexamined Publication No. Sho. 55-153744, and the construction shown in FIG. 9 is disclosed in Japanese Patent Unexamined Publication No. Hei. 5-205714.

A fuse casing 20 shown in FIG. 8 comprises a fuse insertion frame 21 for receiving a fuse 22, and a cover 23 for protecting and holding the inserted fuse 22 against withdrawal. The cover 23 is pivotally mounted on the outer surface of the fuse insertion frame 21 by engaging brackets 24 respectively with projections 25 formed on the outer surface of the fuse insertion frame 21. A lock pawl 26, serving as a lock mechanism, is provided at a distal end of the cover 23, and an engagement portion 27 for engagement with the lock pawl 26 is provided at the fuse insertion frame 21.

A battery holder 30 shown in FIG. 9 has a lock mechanism for preventing disengagement of a battery 34 by the use of a rubber band 31. The rubber hand 31 is connected at one end to the battery holder 30, and has an iron ring 33 secured to the other or distal end thereof. The iron ring 33 is engaged with a hook 32 formed on a side surface of the battery holder 30 while pulling the rubber band 31, thereby preventing the disengagement of the battery 34.

By the way, in the conventional lock mechanism 4 for the electric interrupter shown in FIGS. 5 and 6, the handle 3 is manipulated into the OFF position, and in this condition the lock cover 8 is turned, and further the hole 6 in the handle 3 and the hole Ba in the lock cover 8 are aligned with each other, and furthermore the lock pin 9 is inserted into the aligned holes 6 and 8*a*. By effecting all of these operations, the handle 3 can be locked in a manner to secure the safety, and therefore the locking operation is troublesome, and also a reverse operation must be effected for unlocking the handle 3, and this unlocking operation is troublesome. Besides, if the pin 9 is withdrawn, it is possible that the lock cover 8 is turned, so that the handle . becomes free, and therefore the safety has been required to be further enhanced. Although the construction shown in FIG. 8 can be easily operated or manipulated, the locking can be easily released accidentally, and this construction could not be used for applications requiring high safety. In the construction shown in FIG. 9, once the iron ring 33 is engaged with the hook 32 while pulling the rubber band 31, the locking will not be easily released accidentally, but the locking operation is troublesome.

SUMMARY OF THE INVENTION

With the above problems in view, it is an object of this invention to provide a lock mechanism of such a construction that a locking operation and an unlocking operation can be effected easily, and the locking, once achieved, will not be easily released accidentally.

According to the invention, there is provided a lock mechanism for locking a first member and a second member together, comprising: two plate-like lock piece portions which are provided respectively at the first and second members, and are juxtaposed to each other substantially in a common plane when locking the first and second members together; engagement grooves which are formed respectively through the lock piece portions in a direction of a thickness of the lock piece portions, and have respective openings formed respectively in their respective end surfaces which are juxtaposed to each other, and face in the same direction; and a lock ring of a square-loop shape having opposed straight portions to be fitted respectively in the engagement grooves in the lock piece portions to interconnect the lock piece portion, wherein when viewed in the direction of the thickness of the lock piece portions, each of the engagement grooves has an L-shape defined by an introduction groove portion extending from the opening in a direction substantially perpendicular to the end surface, and a slide groove portion extending from an inner end of the introduction groove portion in a direction substantially parallel to the end surface; wherein the introduction groove portion in the lock piece portion of the first member has a first holding portion for rotatably holding the straight portion of the lock ring; and wherein at least one of an inner end of the slide groove portion in the lock piece portion of the first member and an inner end of the slide groove portion in the lock piece portion of the second member has a second holding portion for holding the straight portion of the lock ring.

DETAILED DESCRIPTION OF THE PREFERRED EMBODIMENT

A preferred embodiment of the present invention will now be described with reference to the drawings.

Figure 1:
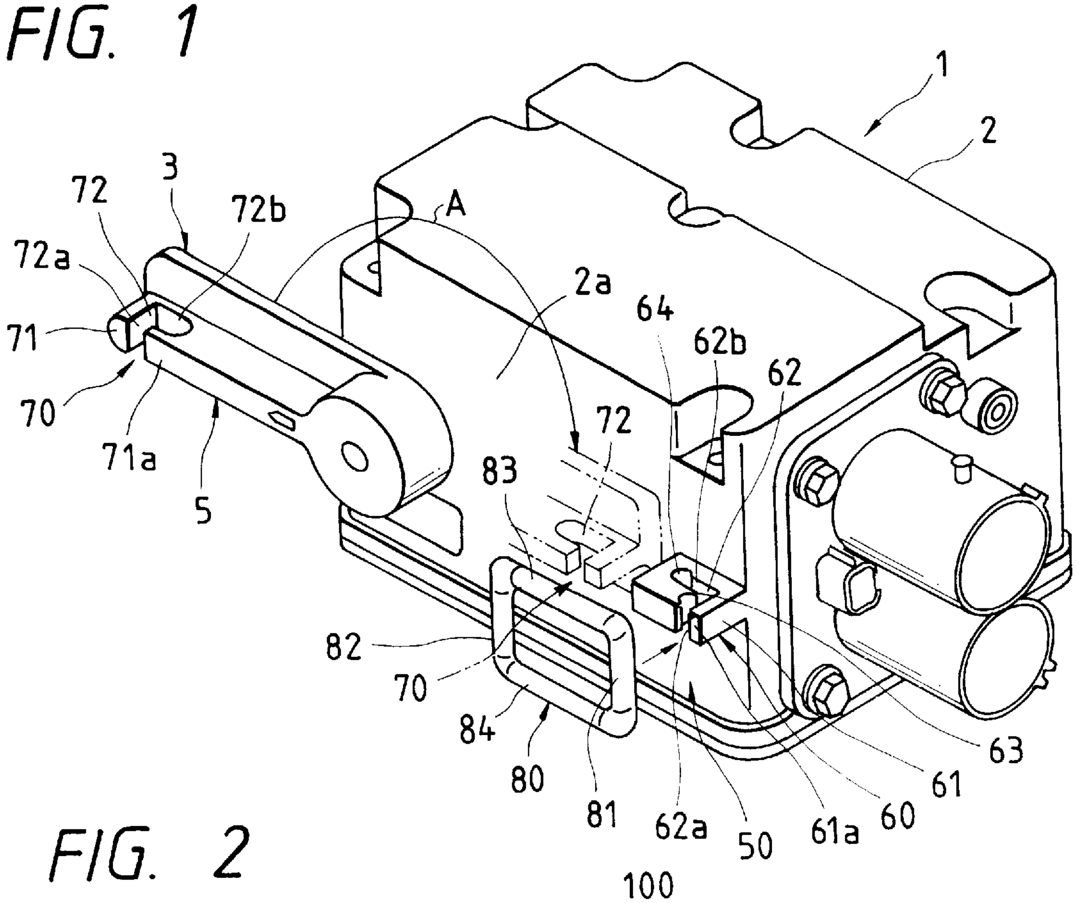
FIG. 1 is a perspective view showing the whole of an electric interrupter incorporating a preferred embodiment of a lock mechanism of the present invention embodiment.
Figure 2:
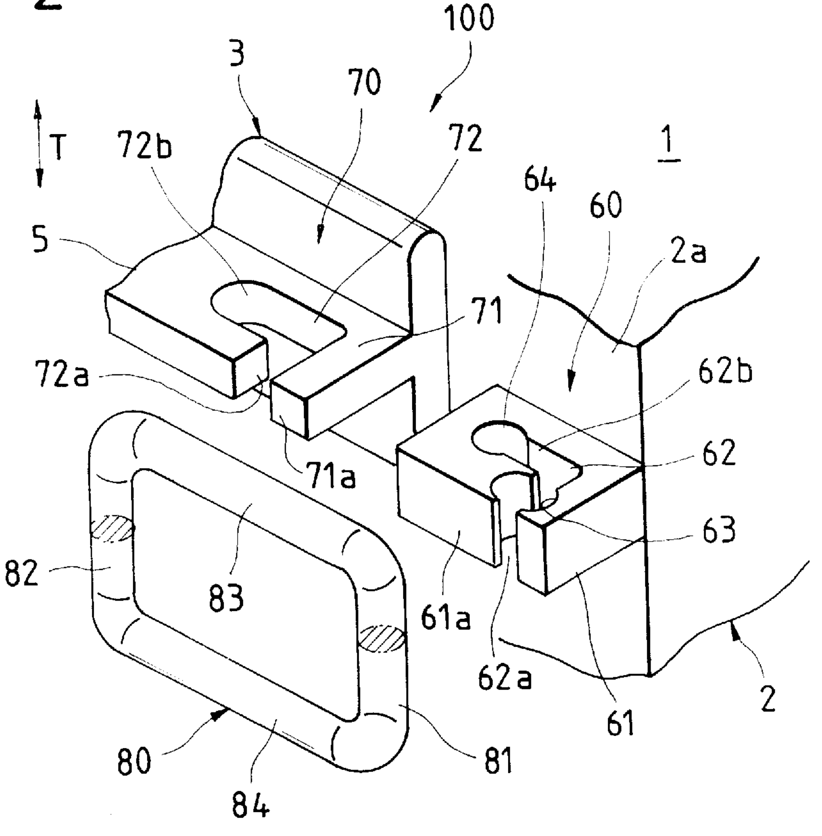
FIG. 2 is a perspective view of the lock mechanism of the embodiment.

FIG. 1 is a perspective view showing the appearance of an electric interrupter 1 of an electric car incorporating a lock mechanism 100 (see FIG. 2) of this embodiment, and FIG. 2 is a perspective view of the lock mechanism 100.

The electric interrupter 1 comprises a casing 2 containing switch means (not shown), and an interrupting handle 3 pivotally mounted on an outer surface 2*a* of the casing 2. Provided between the handle 3 and the casing 2 is the lock mechanism 100 for fixing or locking the handle 3 in an OFF position when the handle 3 is manipulated into this OFF position. The handle 3 can be pivotally moved outwardly into a horizontal position, that is, an ON position, as shown in FIG. 1, and also can be pivotally moved 180 degrees inwardly (indicated by arrow A) from the ON position into a horizontal position, that is, the OFF position. FIG. 2 shows the handle 3 as held in the OFF position.

The lock mechanism 100 comprises a lock portion 60 provided on the casing 2 (first member), a lock portion 70 formed at a distal end of a rib 5 of the handle 3 (second member), and a lock ring 80 for connecting the two lock portions 60 and 70 together.

The lock portion 60, provided on the casing 2, comprises a plate-like lock piece portion 61 formed on the side surface 2*a* of the casing 2. The lock portion 70, provided on the handle 3, comprises a plate-like lock piece portion 71 defined by the distal end portion of the rib 5. When the handle 3 is manipulated into the OFF position as shown in FIG. 2, the two lock piece portions 61 and 71 are juxtaposed to each other in a substantially common plane. The direction of movement of the handle 3 in the vicinity of the OFF position conforms to a direction T of the thickness of the two lock piece portions 61 and 71.

Engagement grooves 62 and 72 are formed respectively through the lock piece portions 61 and 71 in the direction T of the thickness of the lock piece portions 61 and 71, and have respective openings formed respectively in their respective end surfaces 61*a* and 71*a* which are juxtaposed to each other, and face in the same direction. When viewed in the direction T of the thickness of the lock piece portions 61 and 71, each of the engagement grooves 62 and 72 has an L-shape defined by an introduction groove portion 62*a*, 72*a* extending from the opening in a direction substantially perpendicular to the end surface 61*a*, 71*a*, and a slide groove portion 62*b*, 72*b* extending from an inner end of the introduction groove portion 62*a*, 72*a* in substantially parallel relation to the end surface 61*a*, 71*a*.

The lock ring 80 is formed by bending a metal wire of a round cross-section into a rectangular shape, and then by bonding opposite ends thereof together to form a loop. The lock ring 80 is defined by two parallel, opposed straight portions 81 and 82, and two straight portions 83 and 84 interconnecting the straight portions 81 and 82. The engagement grooves 62 and 72 can receive the straight portions 81 and 82 of the lock ring 80, respectively, and the engagement groove 72 in the lock piece portion 71 of the handle 3 has such a width that the straight portion 82 of the lock ring 80 can be easily fitted into the engagement groove 72.

A width of the engagement groove 62 in the lock piece portion 61 formed on the casing 2 is smaller than the diameter of the wire constituting the lock ring 80, as a whole. A first holding portion 63 for rotatably holding the fitted straight portion 81 of the lock ring 80 is formed at the introduction groove portion 62*a* of the engagement groove 62 (in the lock piece portion 61 on the casing 2) intermediate the opposite ends thereof. A second holding portion 64 for fittingly holding the straight portion 81 is formed at the inner end of the slide groove portion 62*b*. Each of the first and second holding portions 63 and 64 is formed into a hole-like shape so sized as to stably fit on the straight portion 81 of the lock ring 80.

The operation will now be described.

Figure 3:
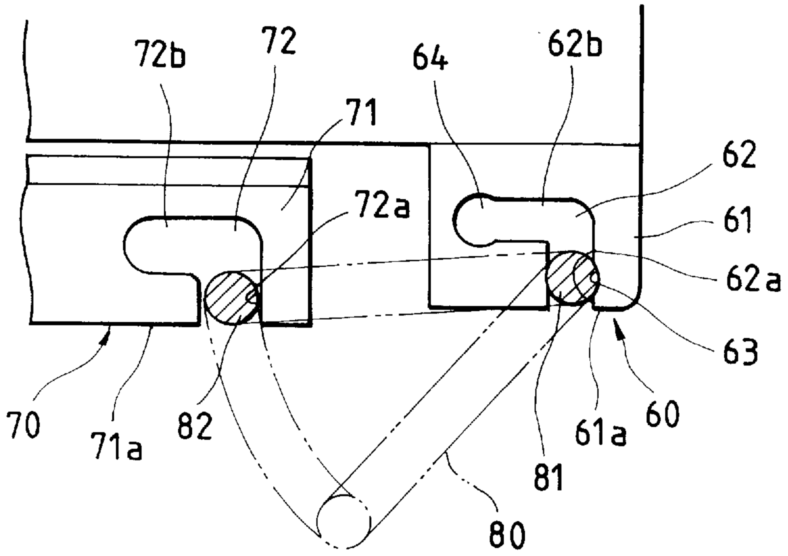
FIG. 3 is a partly cross-sectional, plan view explanatory of the operation of the lock mechanism of the embodiment.

For locking the handle 3, manipulated into the OFF position as shown in FIG. 2, in this OFF position, the two opposed straight portions 81 and 82 of the lock ring 80 are fitted respectively into the engagement grooves 62 and 72, formed respectively in the juxtaposed two lock piece portions 61 and 71, through the respective openings of the introduction groove portions 62*a* and 72*a*. At this time, the straight portion 81 of the lock ring 80 can be once held in the first holding portion 63 in the lock piece portion 61 on the casing 2, as shown in FIG. 3, and in this condition the lock ring 80 is turned about the straight portion 81 fitted in the first holding portion 63, so that the other straight portion 82 of the lock ring 80 can be fitted into the introduction groove portion 72*a* of the engagement groove 72 in the lock piece portion 71 formed on the handle 3.

Figure 4:
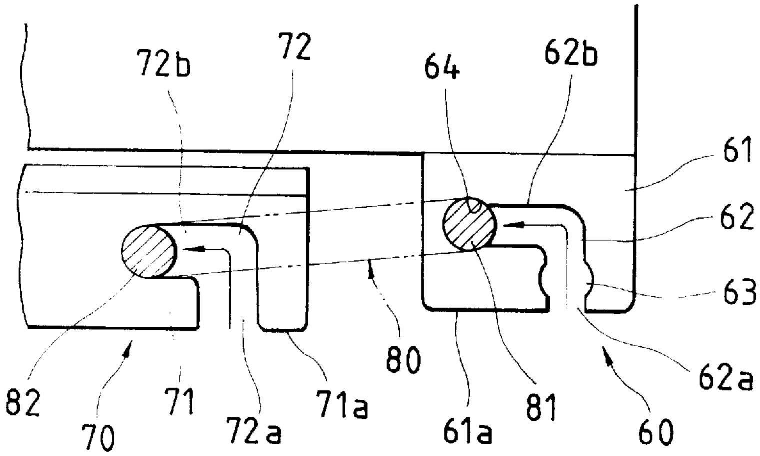
FIG. 4 is a partly cross-sectional, plan view explanatory of the operation of the lock mechanism of the embodiment.
Figure 5:
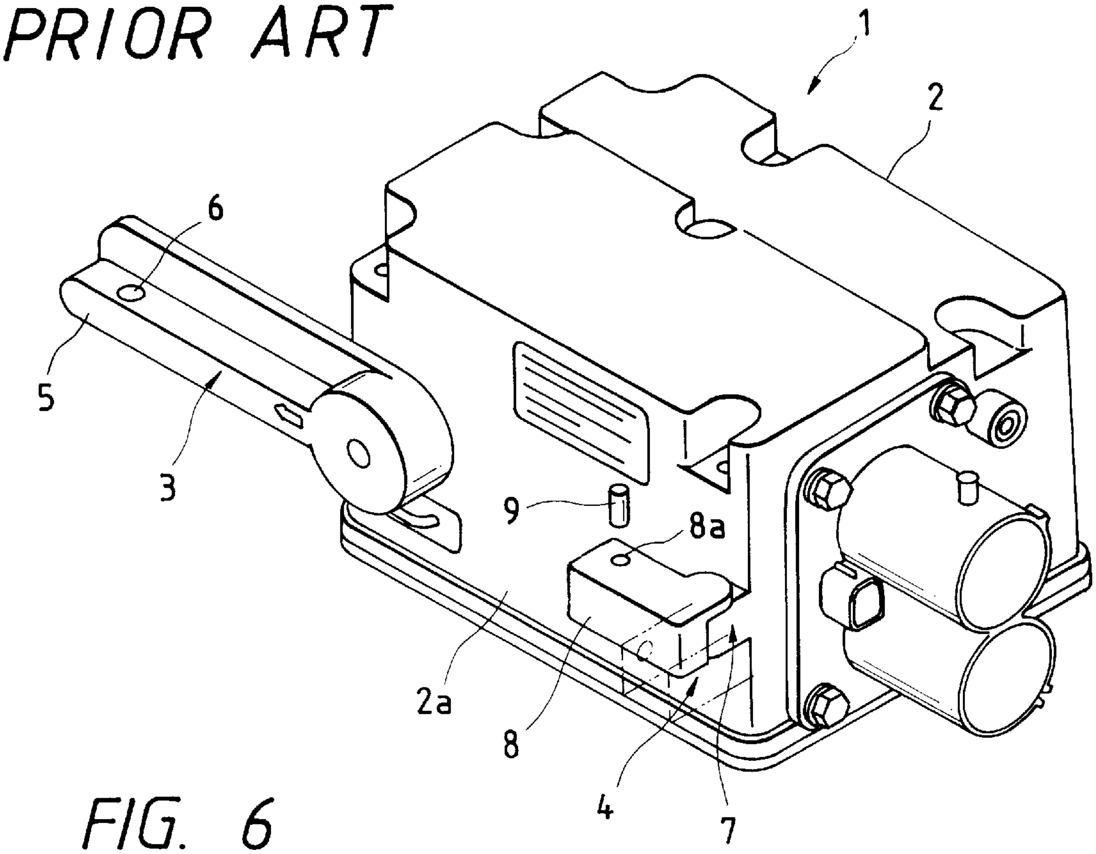
FIG. 5 PRIOR ART
FIG. 5 is a perspective view showing the whole of an electric interrupter incorporating a conventional lock mechanism.
Figure 6:
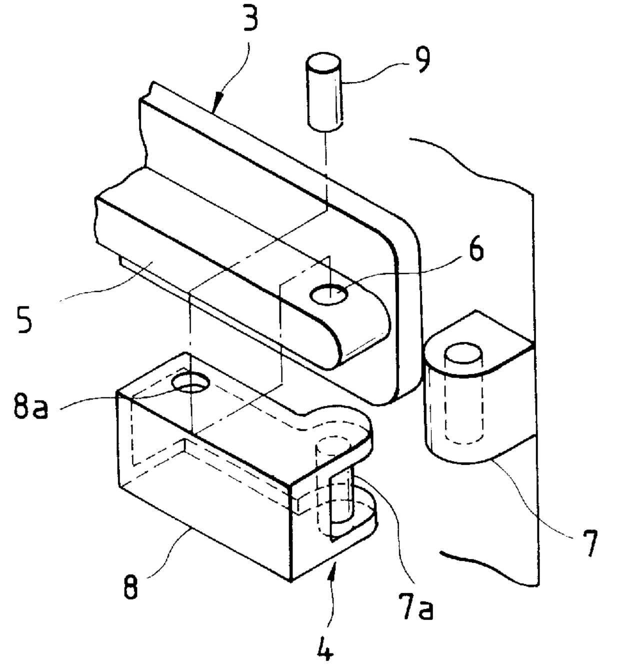
FIG. 6 PRIOR ART
FIG. 6 is an exploded, perspective view of the lock mechanism of FIG. 5.
Figure 7:
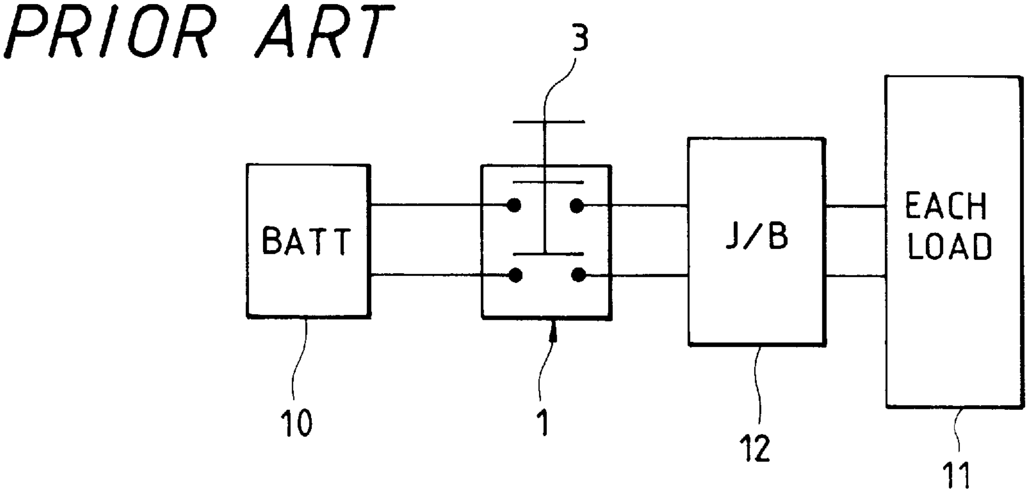
FIG. 7 PRIOR ART
FIG. 7 is a circuit block diagram showing an example of use of the electric interrupter of FIG. 5.
Figure 8:
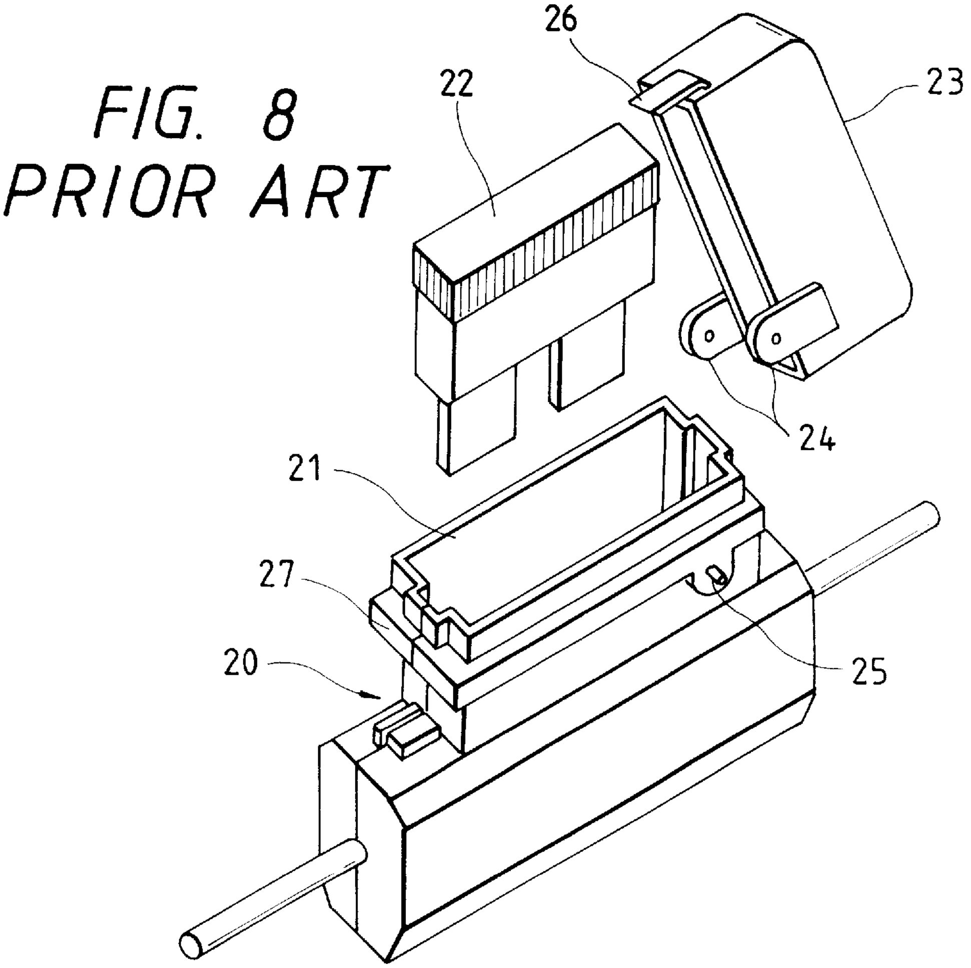
FIG. 8 PRIOR ART
FIG. 8 is a perspective view of a fuse casing incorporating another conventional lock mechanism.
Figure 9:
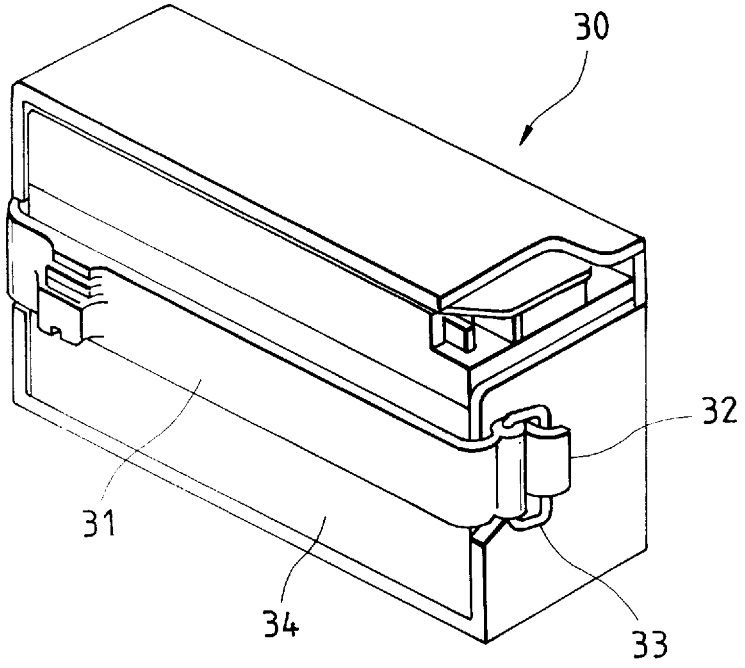
FIG. 9 PRIOR ART
FIG. 9 is a perspective view of a battery holder incorporating still another conventional lock mechanism.

Then, the straight portion 81 is pushed hard to pass past the first holding portion 63, and the two straight portions 81 and 82 of the lock ring 80 are fitted respectively into the slide groove portions 62*b* and 72*b* from the introduction groove portions 62*a* and 72*a* as indicated by arrows in FIG. 4. At the time when the two straight portions 81 and 82 enter the slide groove portions 62*b* and 72*b*, respectively, the lock ring 80 is slid along the slide groove portions 62*b* and 72*b* in a direction parallel to the end surfaces 61*a* and 71*a* of the lock piece portions 61 and 71. Then, when the straight portions 81 and 82 of the lock ring 80 reach the inner ends of the slide groove portions 62*b* and 72*b*, respectively, the straight portion 81 of the lock ring 80 becomes fitted in the second holding portion 64, so that the lock ring 80 is locked relative to the lock piece portion 61. Thus, when the two straight portions 81 and 82 are fitted respectively in the engagement grooves 62 and 72 formed respectively in the lock piece portions 61 and 71, the two lock piece portions 61 and 71 are interconnected by the lock ring 80, so that the handle 3 is locked relative to the casing 2. The lock ring 80 itself is locked relative to the second holding portion 64, and therefore double locking is achieved. In this condition, even if trying to manipulate the handle 3, the handle can not be turned since the distal end portion of the handle 3 is engaged by the lock ring 80.

For releasing this locked condition, the lock ring 80 is first slid along the slide groove portions 62*b* and 72*b* in a direction opposite to the above-mentioned direction. Then, when the two straight portions 81 and 82 of the lock ring 80 respectively reach the junction between the slide groove portion 62*b* and the introduction groove portion 62*a* and the junction between the slide groove portion 72*b* and the introduction groove portion 72*a*, the lock ring 80 is moved in the direction substantially perpendicular to the sliding direction, thereby fitting the two straight portions 81 and 82 respectively into the introduction groove portions 62*a* and 72*a*. As a result, the straight portion 81, fitted in the engagement groove 62 in the lock piece portion 61 on the casing 2, is fitted and held in the first holding portion 63, as shown in FIG. 3.

Then, in this condition, the lock ring 80 is turned outwardly about the straight portion 81 fitted in the first holding portion 63, thereby disengaging the other straight portion 82 from the engagement groove 72 in the lock piece portion 71. As a result, the lock ring 80 is disengaged from the lock piece portion 71 formed on the handle 3, so that the locking of the two lock piece portions 61 and 71 by the lock ring 80 is released. At this time, the lock ring 80 is kept held in the first holding portion 63, and therefore will not drop.

As described above, the lock ring 80 is slid along the slide groove portions 62*b* and 72*b*, and then is moved in the direction substantially perpendicular to the sliding direction, and then is pivotally moved. By effecting all of these operations, the locking of the two lock piece portions 61 and 71 by the lock ring 80 can be released. Thus, the plurality of operations must be effected sequentially, and the locking will not be easily released accidentally. Particularly, the lock ring 80 will not be disengaged from the engagement groove 72 before the straight portion 81 becomes fitted in the first holding portion 63 of the engagement groove 62 as shown in FIG. 3. Therefore, accidental turning of the handle is positively prevented, thus enhancing the safety. Besides, for effecting the locking and for releasing the locking, it is only necessary to move the lock ring 80, and therefore the operation is easy.

In the above embodiment, although the second holding portion 64 is provided at the lock piece portion 61 formed on the casing 2, it may be provided at the lock piece portion 71 formed on the handle 3, or two such holding portions may be provided respectively at the two lock piece portions 61 and 71.

In the above embodiment, although the lock mechanism of the present invention is provided on the electric interrupter 1, the present invention can be applied to various lock mechanisms for other devices.

As described above, in the invention, unless the lock ring is moved in the predetermined directions and in the predetermined sequence, the lock ring will not be disengaged from the engagement groove, and therefore the locking will not be easily released accidentally. Particularly, there can be achieved such double locking that unless a certain condition (i.e., the condition in which one straight portion of the lock ring is held in the first holding portion in one engagement groove) is achieved, the lock ring will not be disengaged, and therefore there is a remote possibility of an erroneous operation, thus enhancing the safety. For effecting the locking and for releasing the locking, it is only necessary to move the lock ring, and there is no need to effect a troublesome operation as in the conventional construction, in which the lock cover is turned, and then the holes in the lock cover and the lever are aligned with each other, and the pin is inserted into the aligned holes. Therefore, the efficiency of the operation is enhanced. Besides, for releasing the locking, it is only necessary to turn the lock ring, with the lock ring held in the first holding portion, and therefore it is not necessary to withdraw a pin and to hold this pin as in the conventional construction.

What is claimed is:

1. A lock mechanism, comprising:

two plate-like lock piece portions provided respectively at first and second members and juxtaposed to each other substantially in a common plane when locking said first and second members together;

engagement grooves formed through said lock piece portions in a direction of a thickness of said lock piece portions, and said engagement grooves having openings formed respectively in end surfaces juxtaposed to each other and facing in the same direction; and a lock ring of a square-loop shape having opposed straight portions to be fitted respectively in said engagement grooves in said lock piece portions to interconnect said lock piece portions, wherein when viewed in the direction of the thickness of said lock piece portions, each of said engagement grooves has an L-shape defined by an introduction groove portion extending from the opening in a direction substantially perpendicular to the end surface, and a slide groove portion extending from an inner end of said introduction groove portion in a direction substantially parallel to the end surface;

wherein said introduction groove portion in said lock piece portion of said first member has a first holding portion for rotatably holding the straight portion of said lock ring; and wherein at least one of an inner end of said slide groove portion in said lock piece portion of said first member and an inner end of said slide groove portion in said lock piece portion of said second member has a second holding portion for holding the straight portion of said lock ring.

2. The lock mechanism according to claim 1, wherein said second member is movable in the direction of the thickness of said lock piece portions.

3. The lock mechanism according to claim 2, wherein said first member is a casing of an electric interrupter, and said second member is an interrupting handle of said electric interrupter which is pivotally and movably mounted on said casing.

4. The lock mechanism according to claim 1, wherein said lock ring is made of a metal wire of a round cross-section.

5. The lock mechanism according to claim 4, wherein a width of said engagement groove in said lock piece portion of said first member is smaller than a diameter of the metal wire constituting said lock ring, as a whole.

* * * * *